W. B. McPIKE.
SPRING WHEEL.
APPLICATION FILED JUNE 16, 1910.

1,013,946.

Patented Jan. 9, 1912.

Witnesses

Jas. F. McCathran
H. H. Riley

W. B. McPike, Inventor

By E. G. Siggers, Attorney

UNITED STATES PATENT OFFICE.

WILLIAM B. McPIKE, OF BOWLING GREEN, MISSOURI.

SPRING-WHEEL.

1,013,946. Specification of Letters Patent. Patented Jan. 9, 1912.

Application filed June 16, 1910. Serial No. 567,327.

*To all whom it may concern:*

Be it known that I, WILLIAM B. MCPIKE, a citizen of the United States, residing at Bowling Green, in the county of Pike and State of Missouri, have invented a new and useful Spring-Wheel, of which the following is a specification.

The invention relates to improvements in spring wheels.

The object of the present invention is to improve the construction of spring wheels, and to provide a simple, efficient and comparatively inexpensive spring wheel, designed to dispense with pneumatic tires of automobiles, bicycles, and the like, and adapted to afford the desired resiliency or cushioning action and the requisite strength for resisting the various strains to which a wheel of this character is subjected.

With these and other objects in view, the inventions consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
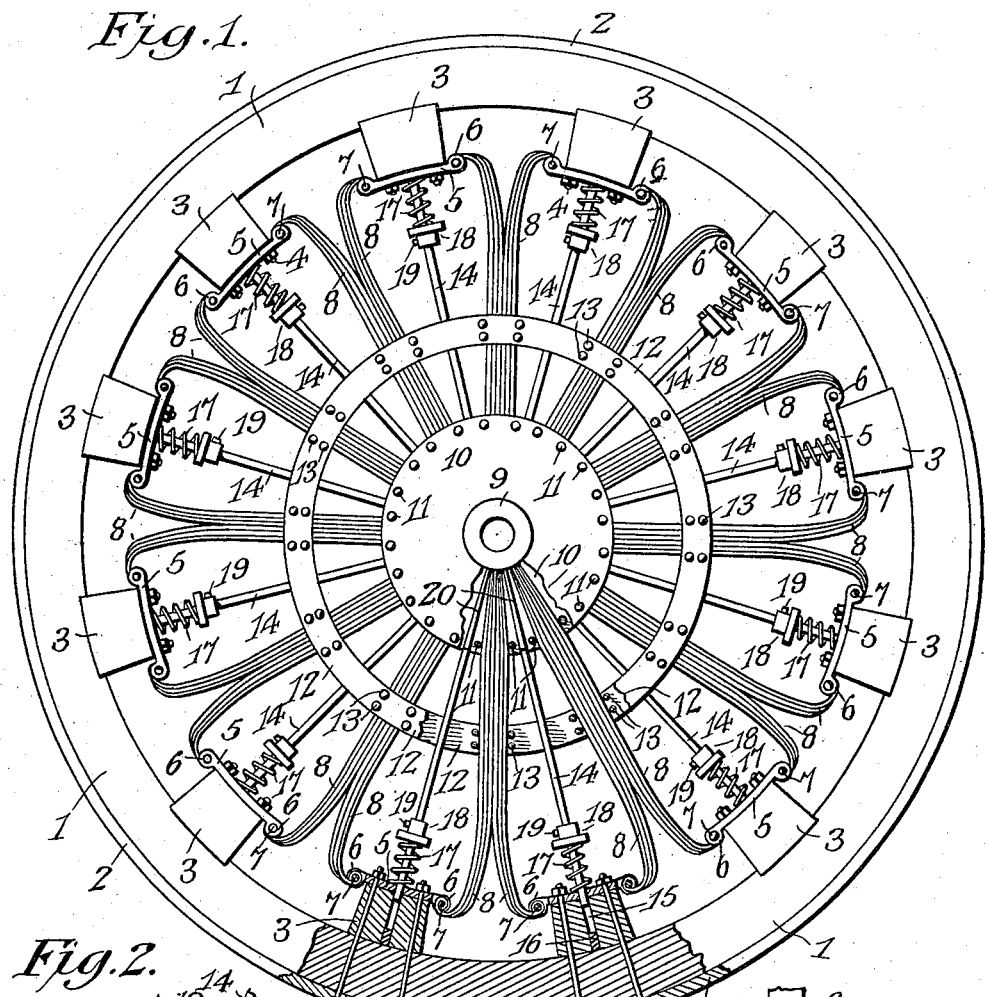
Figure 2:
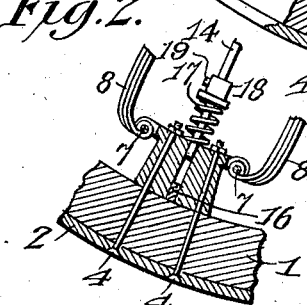
Figure 3:
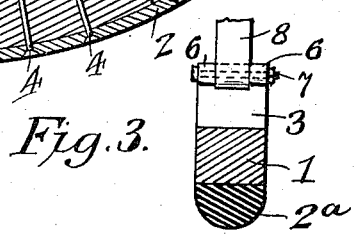

In the drawings:—Figure 1 is an elevation partly in section of a spring wheel, constructed in accordance with this invention. Fig. 2 is a detail sectional view, illustrating another form of the invention. Fig. 3 is a detail sectional view, showing the wooden felly equipped with a solid rubber tire.

Like numerals of reference designate corresponding parts in the figures of the drawing.

In the embodiment of the invention illustrated in the drawing, the wheel is equipped with a wooden felly 1 and a metallic tire 2, but a solid rubber tire 2$^a$ may be employed if desired, as clearly illustrated in Fig. 3 of the drawing. Arranged at the inner face of the rim is an annular series of blocks 3, spaced apart at regular intervals and designed to be constructed of wood, or any other suitable material and secured to the rim of the wheel by bolts 4, piercing the blocks, the felly and the tire and also securing metallic plates 5 to the inner ends of the said blocks. The plates are provided at their ends with lugs or ears 6, extending in opposite directions from the blocks and arranged in pairs and receiving suitable pivots 7 for hinging the outer ends of the leaf springs 8 to the plates, whereby the said springs are connected with the plates. In heavier constructions, the blocks may be constructed of metal and provided with integral lugs or ears for the attachment of the springs. The leaf springs are arranged in pairs and form resilient spokes. They extend from the plates to a centrally arranged hub 9 and converge inwardly, being slightly curved to present outer convex faces to the springs of the adjacent spokes. The inner end portions of the springs are fitted between centrally arranged plates 10 and are secured in place by bolts 11, or other suitable fastening devices, arranged in pairs at the inner faces of the contiguous springs. The plates 10 are provided with central openings to receive the hub 9, and are suitably secured to the same. The hub may be of any preferred design to adapt the wheel for use on a bicycle, automobile, or other vehicle. The spokes are braced at an intermediate point by a pair of rings 12, fitted against the side edges of the springs and connected by bolts 13, arranged in pairs and located at the inner faces of the contiguous springs of each pair of spokes. The springs constituting the spokes may be of any desired strength to adapt the wheel to the character of the vehicle, or other use to which it is to be put. The wheel is also equipped with radially arranged spring rods 14, extending from the hub to the blocks and having their outer ends passing through perforations of the plates 5 and extending into central openings 15 of the said blocks. The openings form sockets for the outer ends of the rods, which have a sliding movement in the openings 15. The blocks are provided at the outer ends of the openings 15 with cushions 16 of rubber, or other suitable material, arranged to receive the rods and adapted to absorb the jars incident to the striking of the outer ends of the rods against the cushions. The outward movement of the rods is yieldably resisted by coiled springs 17, disposed on the rods and interposed between the inner ends of the blocks and adjustable collars 18, secured by set crews 19 to the rods, and adapted to be adjusted along the rods to vary the tension of the springs 17, which have their outer ends bearing against the metallic plates 5. The inner end portions 20 are flattened and are of uniform width with the springs and extend across the space between the central plates 10.

The spring wheel is adapted to afford all the elasticity and cushioning effect of a pneumatic tire, and it possesses sufficient strength to withstand all the strains to which a wheel is subjected, and in traveling over rough surfaces, the spring spokes coact with the coiled springs in absorbing the jar and vibration and in relieving the body of the vehicle of the same.

Having thus fully described my invention, what I claim as new and desire to secure by Letters Patent, is:—

1. A spring wheel including a rim, a hub, resilient spokes consisting of springs arranged in pairs and connected with the hub and with the rim at spaced points around the latter, and radially arranged spring rods also connected with the hub and the rim and slidable between the outer ends of the springs of each pair.

2. A spring wheel including a rim, a hub, resilient spokes consisting of springs arranged in pairs and extending to the hub and connected at their outer ends with the rim, the members of each pair converging inwardly and having their inner portions fitted against the springs of the adjacent spokes, radially arranged rods operating between the springs of each pair and connected with the hub and with the rim, and means located between the outer ends of the springs for cushioning the rods.

3. A spring wheel including a rim, a hub, an annular series of blocks arranged at intervals at the inner periphery of the rim of the wheel, and resilient spokes consisting of springs arranged in pairs and hingedly connected at their outer ends with the blocks at opposite sides thereof and having their inner ends fitted against the hub, centrally arranged plates mounted on the hub and located at opposite sides of the springs, spaced fastening devices connecting the plates and receiving the springs between them, radial rods extending from the hub to the blocks and fitted against the former and slidable in the latter, and cushioning means for the rods located between the springs of each pair.

4. A spring wheel including a rim, a hub, an annular series of blocks arranged at intervals at the inner periphery of the rim of the wheel, and resilient spokes consisting of springs arranged in pairs and hingedly connected at their outer ends with the blocks at opposite sides thereof and having their inner ends fitted against the hub, centrally arranged plates mounted on the hub and located at opposite sides of the springs, spaced fastening devices connecting the plates and receiving the springs between them, and intermediate rings located between the ends of the spokes and having spaced fastening devices connecting the rings and receiving the adjacent springs of the adjacent pairs of spokes between them.

5. A spring wheel including a rim, an annular series of blocks arranged at the inner periphery of the rim, a hub, resilient spokes consisting of springs extending from the hub and hingedly connected at their outer ends with the blocks, resilient rods extending from the hub to the blocks and slidable with respect to the latter, said rods operating between the springs of the spokes and cushioning springs mounted on the outer portions of the rods and having a bearing at the inner ends of the blocks to cushion the outward movement of the rods.

6. A spring wheel including a rim, a hub, an annular series of blocks arranged at the inner periphery of the rim and projecting therefrom, resilient spokes consisting of springs connected at their outer ends with the blocks at spaced points on the same, rods extending from the hub to the blocks and slidable inwardly and outwardly through the latter between the adjacent ends of the springs, coiled springs located between the springs of the spokes and disposed on the rods and having a bearing at the inner ends of the blocks, and adjusting devices mounted on the rods and engaging the coiled springs for varying the tension thereof.

7. A spring wheel including a rim, a hub, an annular series of blocks arranged at the inner periphery of the rim and provided with openings, cushions arranged in the openings, radial rods extending from the hub to the blocks and slidable in the openings thereof and normally spaced from the cushions, spokes consisting of springs connected with the hub and with the block at opposite sides of the said openings, and coiled springs connected with the rods and seated against the blocks between the attached ends of the springs of the spokes.

8. A spring wheel including a rim, a hub, an annular series of blocks arranged at the inner periphery of the rim, resilient spokes consisting of springs arranged in pairs and having their outer ends hinged at opposite sides of the blocks, the inner ends of the springs being fitted against the hub, rods arranged between the members of each pair of springs and slidable in the blocks between the outer ends of the springs and having inner end portions of uniform width with the springs and fitted against the hub, and central plates mounted on the hub and fitted against the springs and the inner ends of the rods.

9. A spring wheel including a rim, a hub, an annular series of blocks arranged at the inner periphery of the rim, resilient spokes consisting of springs arranged in pairs and having their outer ends hinged at opposite sides of the blocks, the inner ends of the springs being fitted against the hub, rods arranged between the members of each pair of springs and slidable in the blocks between the outer ends of the springs and having inner end portions of uniform width with the springs and fitted against the hub, central plates mounted on the hub and fitted against the springs and the inner ends of the rods, and intermediate rings located between the central plates and the blocks and fitted against the springs of the spokes and connected with each other.

10. A spring wheel including a tire, a felly, a hub, an annular series of blocks arranged at the inner face of the felly, bolts piercing the blocks, the felly and the tire, plates secured to the inner ends of the blocks by the said bolts and having projecting ears, resilient spokes consisting of leaf springs arranged in pairs and hinged at their outer ends to the said ears and having their inner ends fitted against the said hub, radially arranged rods also fitted at their inner ends with the hub and having their outer portions piercing the plates and slidable in the blocks, cushions arranged in the blocks and adapted to be engaged by the rods, and cushioning springs mounted on the rods and bearing against the plates.

In testimony, that I claim the foregoing as my own, I have hereto affixed my signature in the presence of two witnesses.

WILLIAM B. McPIKE.

Witnesses:
R. L. POLLARD,
W. J. HUFTY.

---

Copies of this patent may be obtained for five cents each, by addressing the "Commissioner of Patents, Washington, D. C."